(12) United States Patent
Chang (10) Patent No.: US 11,921,395 B2
(45) Date of Patent: Mar. 5, 2024

(54) REFLECTIVE ACTIVE DEVICE ARRAY SUBSTRATE AND MANUFACTURING METHOD THEREOF AND REFLECTIVE DISPLAY APPARATUS AND MANUFACTURING METHOD THEREOF

(71) Applicant: E Ink Holdings Inc., Hsinchu (TW)

(72) Inventor: Chien-Hsing Chang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 803 days.

(21) Appl. No.: 16/845,095

(22) Filed: Apr. 10, 2020

(65) Prior Publication Data
US 2020/0341344 A1    Oct. 29, 2020

(30) Foreign Application Priority Data
Apr. 23, 2019   (TW) .................................. 108114047

(51) Int. Cl.
*G02F 1/1677*    (2019.01)
*G02F 1/167*    (2019.01)
(Continued)

(52) U.S. Cl.
CPC ............ *G02F 1/1677* (2019.01); *G02F 1/167* (2013.01); *G02F 1/16755* (2019.01);
(Continued)

(58) Field of Classification Search
CPC ............ H01L 29/7869; H01L 27/1225; H01L 27/3262; H01L 27/3276; H01L 51/5221; H01L 27/124; H01L 27/1244; H01L 29/04; H01L 29/24; H01L 29/41733; H01L 29/66969; H01L 2924/00;
(Continued)

(56) References Cited

U.S. PATENT DOCUMENTS

| | | |
|---|---|---|
| 8,049,952 B2 | 11/2011 | Song et al. |
| 8,059,329 B2 | 11/2011 | Song et al. |

(Continued)

FOREIGN PATENT DOCUMENTS

| | | |
|---|---|---|
| CN | 1452142 | 10/2003 |
| CN | 102054873 | 5/2011 |

(Continued)

OTHER PUBLICATIONS

"Office Action of China Counterpart Application", dated Nov. 23, 2023, p. 1-p. 8.

*Primary Examiner* — Brandi N Thomas
(74) *Attorney, Agent, or Firm* — JCIPRNET (57) ABSTRACT

A reflective active device array substrate includes a substrate, a plurality of active devices, a protective layer, and a plurality of metal oxide conductor layers. The active devices are dispersedly disposed on the substrate. The protective layer is disposed on the substrate and covers the active devices. The protective layer has a plurality of openings, and each of the openings exposes a source or a drain of the corresponding active device, respectively. The metal oxide conductor layers are disposed on the substrate and cover the protective layer. Each of the metal oxide conductor layers is electrically connected to the source or the drain of the corresponding active device through the corresponding opening.

7 Claims, 5 Drawing Sheets

(51) Int. Cl.
*G02F 1/16755* (2019.01)
*G02F 1/16756* (2019.01)
*G09F 9/30* (2006.01)
*G02F 1/1675* (2019.01)

(52) U.S. Cl.
CPC .......... *G02F 1/16756* (2019.01); *G09F 9/301* (2013.01); *G02F 2001/1678* (2013.01)

(58) Field of Classification Search
CPC ........... H01L 2924/0002; G02F 1/1368; G02F 1/136227; G02F 1/134363; G02F 1/136286; G02F 1/134372; G02F 1/134309; G02F 1/133555; G02F 1/133512; G02F 1/136213; G02F 1/133345; G02F 1/133567; G02F 1/133615; G02F 1/134318; G02F 1/13454; G02F 1/136209; G02F 2201/123; G02F 2201/121; G02F 1/133516; G02F 1/133536; G02F 1/133545; G02F 1/133553; G02F 2201/40; G02F 1/136231; G02F 1/133509; G02F 1/133707; G02F 1/134336; G02F 1/134345; G02F 1/1362; G02F 1/136218; G02F 1/136263; G02F 2201/50; G02F 2202/02; G02F 1/133514; G02F 1/13439; G02F 1/1345; G02F 1/13629; G02F 1/133334; G02F 1/133354; G02F 1/1337; G02F 1/133711; G02F 1/133776; G02F 1/13378; G02F 1/133788; G02F 1/13394; G02F 1/1343; G02F 1/13458; G02F 1/136204; G02F 1/136222; G02F 1/136259; G02F 1/136295; G02F 1/1393; G02F 1/136236; G02F 2201/128; G02F 2202/103
See application file for complete search history.

(56) References Cited

U.S. PATENT DOCUMENTS

| | | |
|---|---|---|
| 8,760,596 B2 | 6/2014 | Choi et al. |
| 2009/0078938 A1 | 3/2009 | Yamazaki |
| 2010/0072467 A1* | 3/2010 | Yamazaki ........... H01L 27/1225 257/E33.013 |
| 2012/0081406 A1 | 4/2012 | Li et al. |
| 2016/0372490 A1* | 12/2016 | Zhang .................. G02F 1/1345 |

FOREIGN PATENT DOCUMENTS

| | | | | |
|---|---|---|---|---|
| CN | 102160104 | | 8/2011 | |
| CN | 102495506 | | 6/2012 | |
| CN | 102955301 | | 3/2013 | |
| CN | 102955318 | | 3/2013 | |
| CN | 104102052 | | 10/2014 | |
| CN | 104570515 | | 4/2015 | |
| JP | 2004004757 | * | 1/2013 | ......... H01L 27/1288 |
| TW | 201216477 | | 4/2012 | |
| TW | 201415148 | | 4/2014 | |
| TW | 201541649 | | 11/2015 | |
| TW | 201611252 | | 3/2016 | |
| TW | 201804623 | | 2/2018 | |

* cited by examiner

REFLECTIVE ACTIVE DEVICE ARRAY SUBSTRATE AND MANUFACTURING METHOD THEREOF AND REFLECTIVE DISPLAY APPARATUS AND MANUFACTURING METHOD THEREOF

CROSS-REFERENCE TO RELATED APPLICATION

This application claims the priority benefit of Taiwan application serial no. 108114047, filed on Apr. 23, 2019. The entirety of the above-mentioned patent application is hereby incorporated by reference herein and made a part of this specification.

BACKGROUND

Technical Field

The disclosure relates to a substrate and a manufacturing method thereof, and in particular to a reflective active device array substrate and a manufacturing method thereof and a reflective display apparatus and a manufacturing method thereof adopting the same.

Description of Related Art

Electrophoretic display apparatuses are mostly reflective display apparatuses, using the electrophoretic particles therein to reflect the external light beam, so as to achieve the purpose of displaying images. So far, the active device array substrate of the electrophoretic display apparatus mostly uses an opaque metal material as conductive electrodes. In addition to the conductive effect, the conductive electrodes of the metal material may shield light to avoid the photoelectric effect of the active devices due to illumination. However, when a broken hole is formed in the display medium layer, the conductive electrodes of the metal material may directly reflect the light, causing the viewer to see a bright spot, thereby affecting the quality of the product.

SUMMARY

The disclosure provides a reflective active device array substrate replacing a conventional metal conductive electrode with a metal oxide conductor layer, and having a lower light reflectivity, and can reduce external light reflection.

The disclosure provides a manufacturing method of a reflective active device array substrate to manufacture the reflective active device array substrate.

The disclosure provides a reflective display apparatus, including the reflective active device array substrate having a better display quality.

The disclosure provides a manufacturing method of a reflective display apparatus used to manufacture the reflective display apparatus.

A reflective active device array substrate of the disclosure includes a substrate, a plurality of active devices, a protective layer, and a plurality of metal oxide conductor layers. The active devices are dispersedly disposed on the substrate. The protective layer is disposed on the substrate and covers the active devices. The protective layer has a plurality of openings, and each of the openings respectively exposes a source or a drain of each of the corresponding active devices. The metal oxide conductor layers are disposed on the substrate and cover the protective layer. Each of the metal oxide conductor layers is electrically connected to the source or the drain of each of the corresponding active devices through each of the corresponding openings.

In an embodiment of the disclosure, a material of each of the metal oxide conductor layers includes molybdenum oxide, molybdenum-niobium oxide, tantalum oxide, or aluminum oxide.

In an embodiment of the disclosure, each of the active devices includes a gate, a semiconductor channel layer, a gate insulating layer and the source and the drain. The gate is disposed on the substrate. The gate insulating layer covers the gate and is located between the gate and the semiconductor channel layer. The source and the drain are disposed on a same side of the semiconductor channel layer and expose a portion of the semiconductor channel layer.

A manufacturing method of a reflective active device array substrate of the disclosure, including following steps. An array substrate is provided. The array substrate includes a substrate, a plurality of active devices and a protective layer. The active devices are dispersedly disposed on the substrate, and the protective layer is formed on the substrate and covers the active devices. The protective layer has a plurality of openings, and each of the openings respectively exposes a source or a drain of each of the corresponding active devices. The array substrate is moved into a reaction chamber, wherein a metal target material is disposed in the reaction chamber. A reactant gas is pumped into the reaction chamber to perform a chemical reaction with the metal target material, and a plurality of metal oxide conductor layers are formed on the array substrate. The metal oxide conductor layers cover the protective layer, and each of the metal oxide conductor layers is electrically connected to the source or the drain of each of the corresponding active devices through each of the corresponding openings.

In an embodiment of the disclosure, the metal target material includes molybdenum, molybdenum-niobium, tantalum, or aluminum, and the reactant gas includes oxygen.

In an embodiment of the disclosure, each of the active devices includes a gate, a semiconductor channel layer, a gate insulating layer and the source and the drain. The gate is disposed on the substrate. The gate insulating layer covers the gate and is located between the gate and the semiconductor channel layer. The source and the drain are disposed on a same side of the semiconductor channel layer and expose a portion of the semiconductor channel layer.

A reflective display apparatus of the disclosure includes a reflective active device array substrate and an electrophoretic display film. The reflective active device array substrate includes a substrate, a plurality of active devices, a protective layer and a plurality of metal oxide conductor layers. The active devices are dispersedly disposed on the substrate. The protective layer is disposed on the substrate and covers the active devices. The protective layer has a plurality of opening, and each of the openings respectively exposes a source or a drain of each of the corresponding active devices. The metal oxide conductor layers are disposed on the substrate and cover the protective layer. Each of the metal oxide conductor layers is electrically connected to the source or the drain of each of the corresponding active devices through each of the corresponding openings. An electrophoretic display film is disposed on the reflective active device array substrate.

In an embodiment of the disclosure, a material of each of the metal oxide conductor layers includes molybdenum oxide, molybdenum-niobium oxide, tantalum oxide, or aluminum oxide.

In an embodiment of the disclosure, each of the active devices includes a gate, a semiconductor channel layer, a gate insulating layer and the source and the drain. The gate is disposed on the substrate. The gate insulating layer covers the gate and is located between the gate and the semiconductor channel layer. The source and the drain are disposed on a same side of the semiconductor channel layer, and expose a portion of the semiconductor channel layer.

In an embodiment of the disclosure, the electrophoretic display film includes a flexible substrate, a transparent conductive layer and a display medium layer. The transparent conductive layer is disposed on the flexible substrate, and is located between the reflective active device array substrate and the flexible substrate. The display medium layer is disposed on the flexible substrate and is located between the reflective active device array substrate and the transparent conductive layer. The display medium layer includes a plurality of display mediums. Each of the display mediums includes an electrophoretic liquid and a plurality of charged particles distributed in the electrophoretic liquid.

A manufacturing method of a reflective display apparatus of the disclosure includes following steps. A reflective active device array substrate is formed, including providing an array substrate. The array substrate includes a substrate, a plurality of active devices and a protective layer. The active devices are dispersedly disposed on the substrate, and the protective layer is formed on the substrate and covers the active devices. The protective layer has a plurality of openings, and each of the openings respectively exposes a source or a drain of each of the corresponding active devices. The array substrate is moved into a reaction chamber, wherein a metal target material is disposed in the reaction chamber. A reactant gas is pumped into the reaction chamber to perform a chemical reaction with the metal target material, and a plurality of metal oxide conductor layers are formed on the array substrate. The metal oxide conductor layers cover the protective layer and each of the metal oxide conductor layers is electrically connected to the source or the drain of each of the corresponding active devices through each of the corresponding openings. An electrophoretic display film is assembled on the reflective active device array substrate.

In an embodiment of the disclosure, a method of forming the metal oxide conductor layers includes: pumping oxygen gas into the reaction chamber when bombarding the metal target material with a plasma.

Based on the above, in the structure of the reflective active device array substrate of the disclosure, the metal oxide conductor layers are used as the conductive electrode. Compared with the conventional use of the metal material as the conductive electrodes, the metal oxide conductor layers of the disclosure has a lower light reflectivity, and may reduce external light reflection. Therefore, the reflective display apparatus adopting the reflective active device array substrate of the disclosure may make the reflective display apparatus have a better display quality since the metal oxide conductor layers may reduce the reflection of external light without generating bright spots when a broken hole occurs to the electrophoretic display film thereof.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
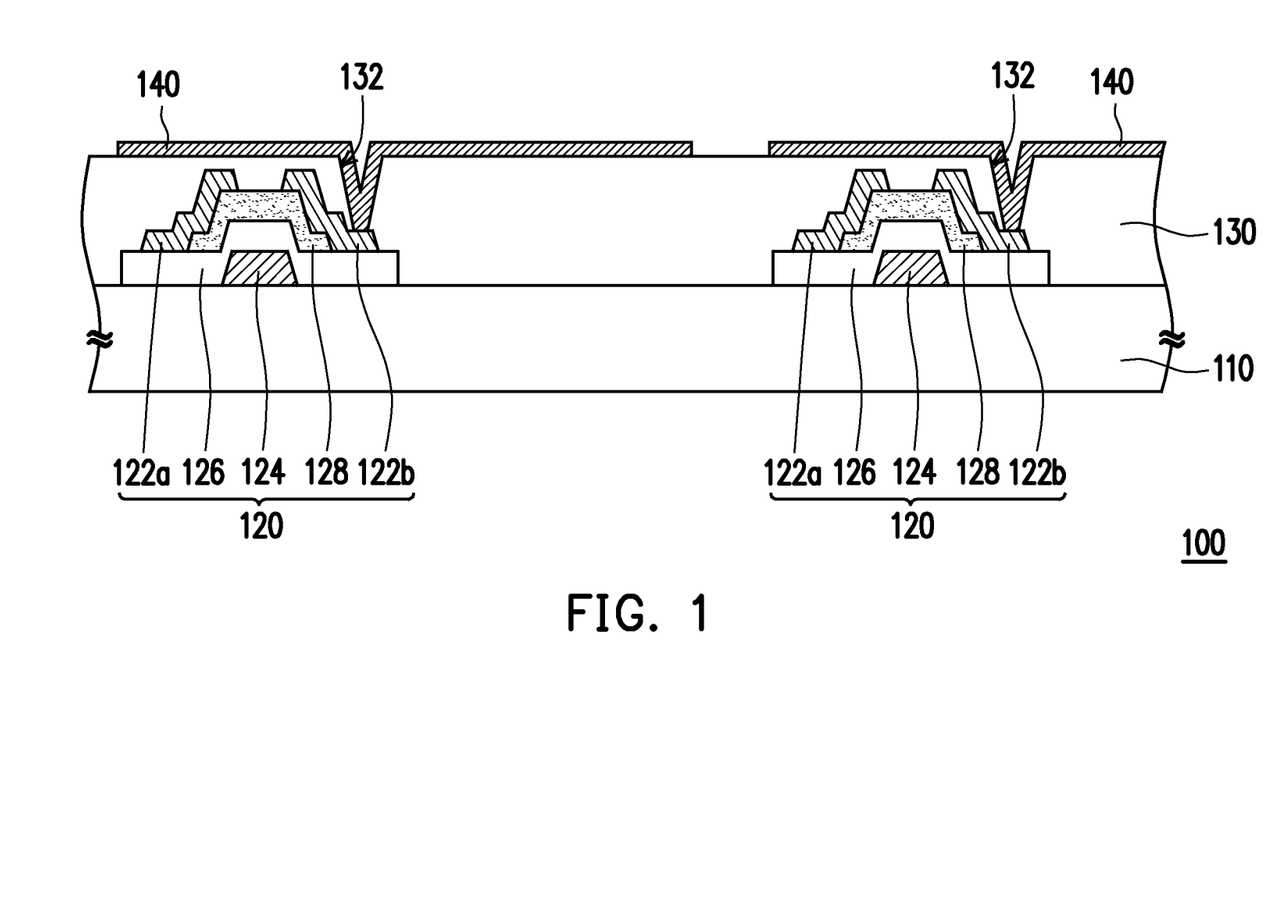
FIG. 1 is a cross-sectional schematic view of a reflective active device array substrate of an embodiment of the disclosure.

FIG. 1 is a cross-sectional schematic view of a reflective active device array substrate of an embodiment of the disclosure. Please refer to FIG. 1, a reflective active device array substrate 100 of the present embodiment includes a substrate 110, a plurality of active devices 120 (Only two are drawn schematically in FIG. 1), a protective layer 130 and a plurality of metal oxide conductor layers 140 (only two are drawn schematically in FIG. 1). The active devices 120 are dispersedly disposed on the substrate 110. The protective layer 130 is disposed on the substrate 110 and covers the active devices 120. The protective layer 130 has a plurality of openings 132 (only two are drawn schematically in FIG. 1), and each of the openings 132 respectively exposes a source 122$a$ or a drain 122$b$ of the corresponding active devices 120. The metal oxide conductor layers 140 are disposed on the substrate 110 and cover the protective layer 130. Each of the metal oxide conductor layers 140 is electrically connected to the source 122$a$ or the drain 122$b$ of each of the corresponding active devices 120 through each of the corresponding openings 132.

Specifically, the active devices 120 of the present embodiment include a gate 124, a semiconductor channel layer 128, a gate insulating layer 126, the source 122$a$ and the drain 122$b$. The gate 124 is located on the substrate 110, and the gate insulating layer 126 covers the gate 124 and a portion of the substrate 110. The semiconductor channel layer 128 is located on a side of the gate insulating layer 126 opposite to the gate 124 and does not contact the gate 124, which means that the gate insulating layer 126 is disposed between the gate 124 and the semiconductor channel layer 128. The source 122$a$ and the drain 122$b$ are disposed on a same side of the semiconductor channel layer 128, and expose a portion of the semiconductor channel layer 128. Herein, from a way of arranging the gate 124, the gate insulating layer 126, the semiconductor layer 128, the source 122$a$ and the drain 122$b$, it can be known that the active devices 120 of the present embodiment are specifically made as a bottom gate thin film transistor, but is not limited hereto. The disclosure does not limit a structure type of the active devices 120. In other embodiments, the active devices may also be a top gate thin film transistor, which still belongs to the scope desired to be protected by the disclosure.

Please refer to FIG. 1, the openings 132 of the protective layer 130 of the present embodiment expose the drain 122$b$ of the corresponding active devices 120. However, in other embodiments that are not drawn, the openings of the protective layer may also expose the source of the corresponding active devices. The metal oxide conductor layers 140 are electrically connected to the drain 122$b$ of each of the corresponding active devices 120 through the corresponding openings 132. Herein, the metal oxide conductor layers 140 have opaqueness (which is light shielding effect), conductivity and low reflection characteristic, wherein a material of the metal oxide conductor layers 140 may be molybdenum oxide, molybdenum-niobium oxide, tantalum oxide, aluminum oxide or other metal oxides with low reflectivity.

Briefly, in the structure of the reflective active device array substrate 100 of the present embodiment, the metal oxide conductor layers 140 are used as the conductive electrode. Compared with the conventional use of a metal material as the conductive electrode, the metal oxide conductor layers 140 of the present embodiment has a lower reflectivity and can reduce external light reflection. Moreover, the metal oxide conductor layers 140 of the present embodiment do not affect the product feature of the reflective active device array substrate 100 since the material feature thereof still has opaqueness (which is light shielding effect), conductivity and reflection characteristic. In addition, the metal oxide conductor layers 140 of the present embodiment has a better anti-corrosion capability than the conductive electrode of the metal material, and the reflective active device array substrate 100 has a better product reliability.

Descriptions above only explain the structure of the reflective active device array substrate 100 of the present embodiment. Following descriptions would explain a manufacturing method of the reflective active device array substrate 100 of the present embodiment with a flow chart of FIG. 2 and cross-sectional schematic views of FIG. 3A and FIG. 3B.

Figure 2:
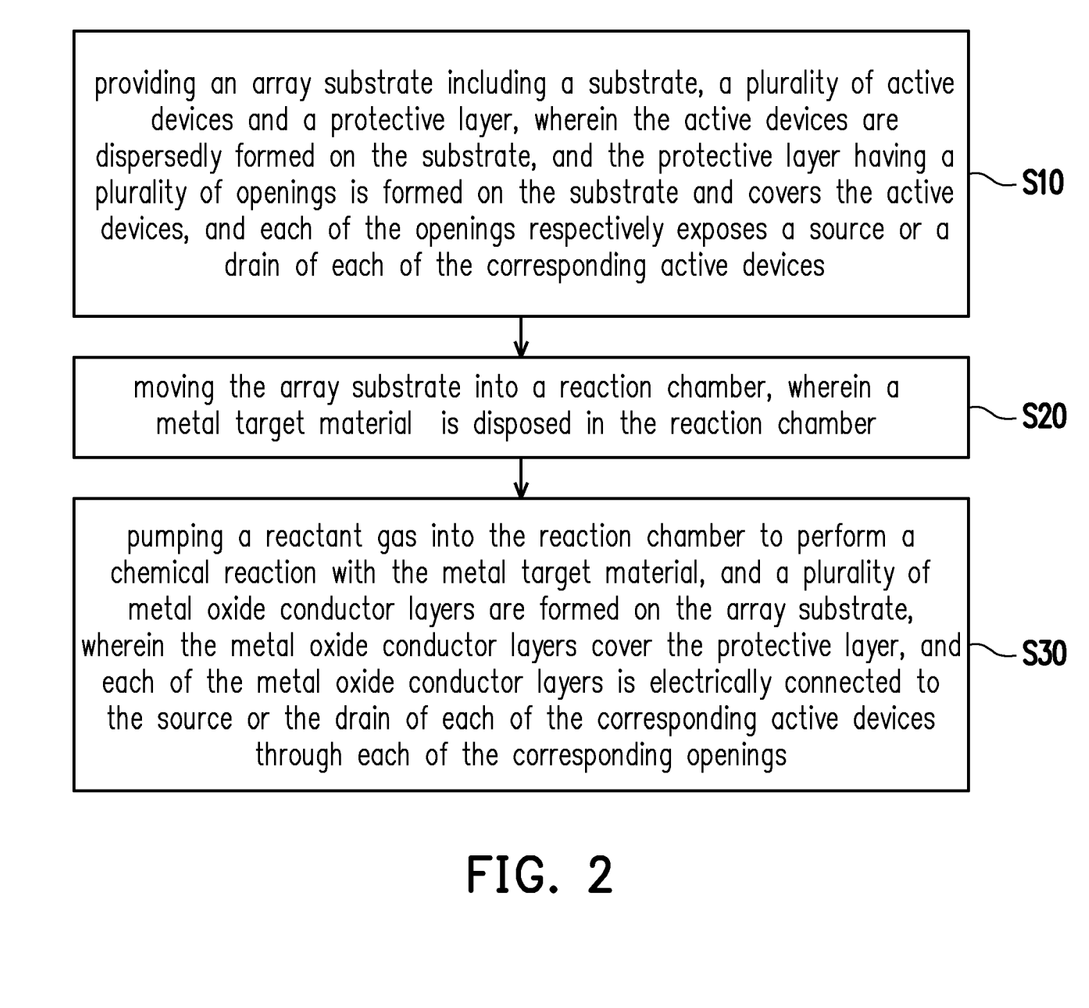
FIG. 2 is a flow chart of a manufacturing method of a reflective active device array substrate of an embodiment of the disclosure.
Figure 3A:
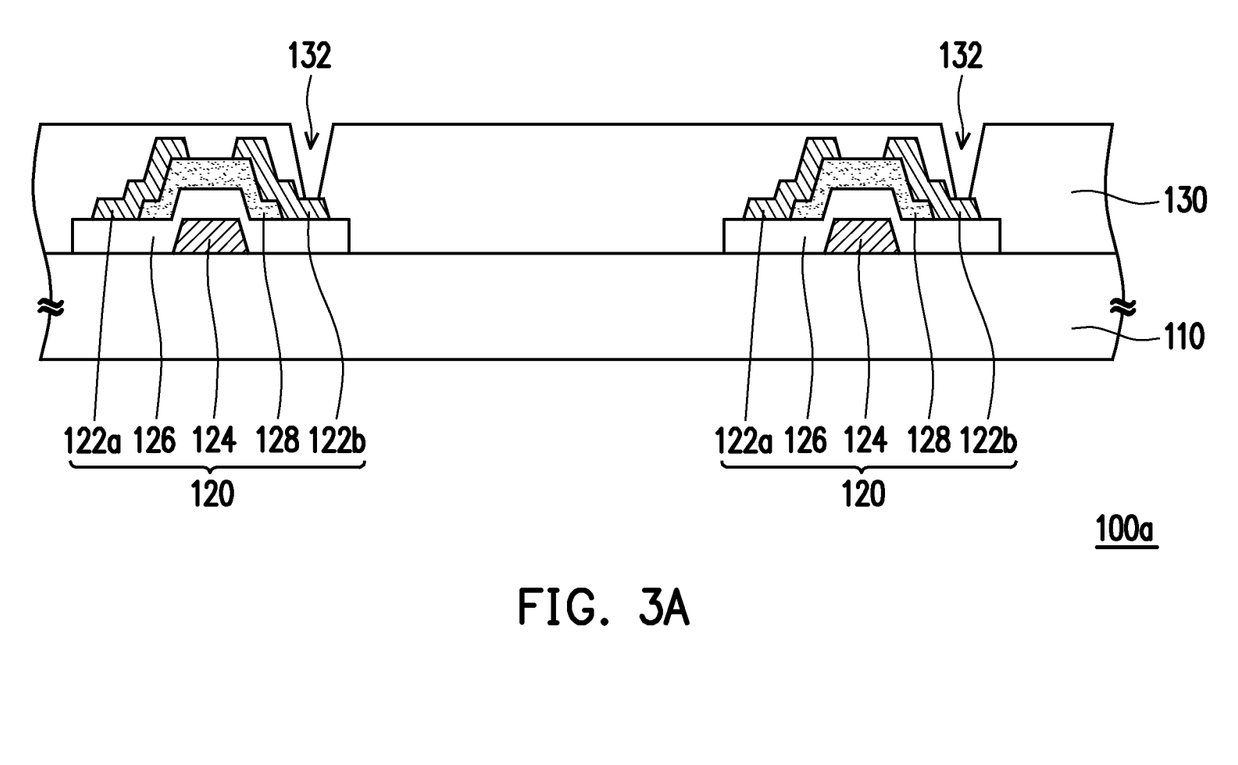
FIG. 3A to FIG. 3B are cross-sectional schematic views of the manufacturing method of the reflective active device array substrate of FIG. 2.
Figure 3B:
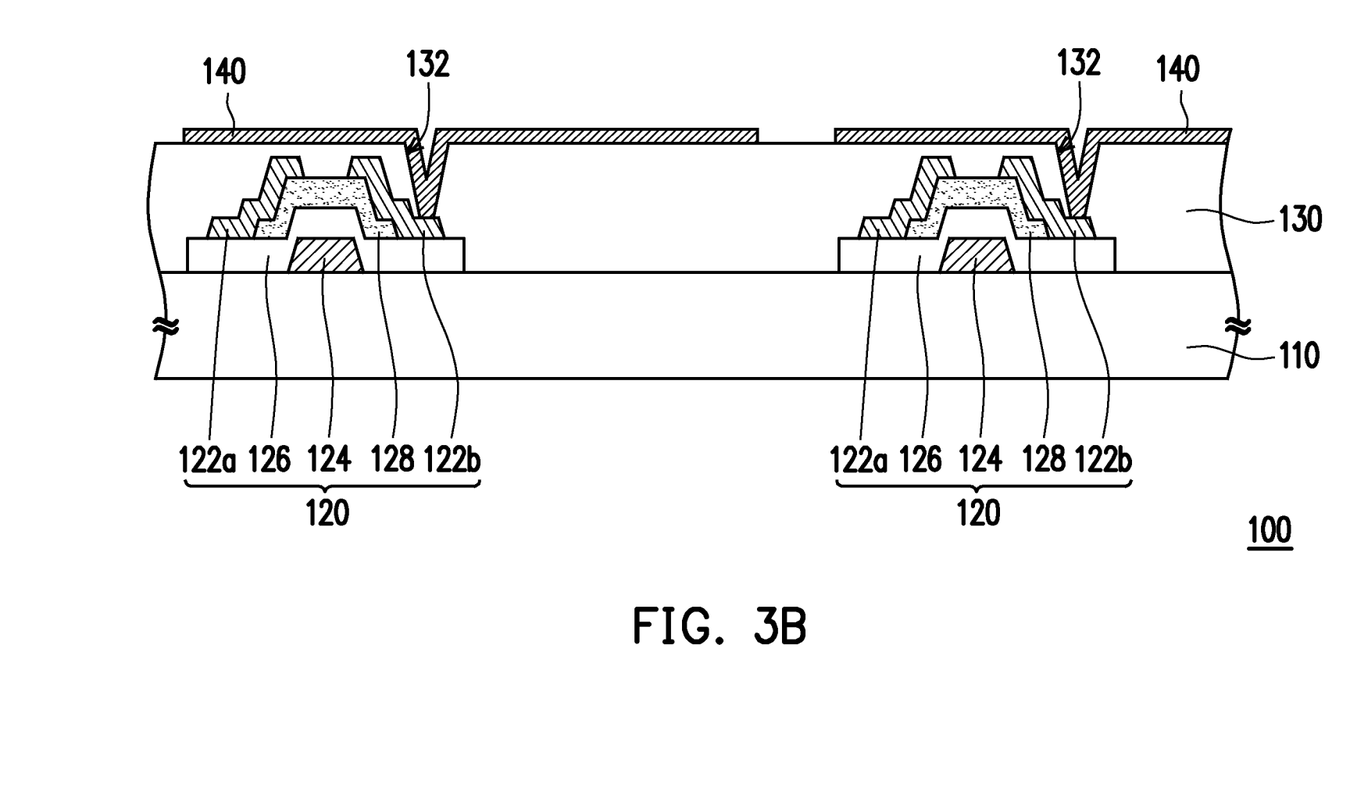

FIG. 2 is a flow chart of a manufacturing method of a reflective active device array substrate of an embodiment of the disclosure. FIG. 3A to FIG. 3B are cross-sectional schematic views of the manufacturing method of the reflective active device array substrate of FIG. 2. Please refer to FIG. 2 and FIG. 3A simultaneously. Firstly, in a step S10, an array substrate 100a is provided, wherein the array substrate 100a includes the substrate 110, the plurality of active devices 120 (only two are drawn schematically in FIG. 3A) and the protective layer 130. The active devices 120 are dispersedly formed on the substrate 110, and the protective layer 130 is formed on the substrate 110 and covers the active devices 120. The protective layer 130 has the plurality of openings 132 (only two are drawn schematically in FIG. 3A), and each of the openings 132 respectively exposes the drain 122b of each of the corresponding active devices 120.

Further, please refer to FIG. 2 and FIG. 3A simultaneously. In a step S20, the array substrate 100a is moved into a reaction chamber (not drawn), wherein a metal target material (not drawn) is disposed in the reaction chamber. Herein, the target material is, for example, molybdenum, molybdenum-niobium, tantalum, or aluminum.

Afterward, please refer to FIG. 2 and FIG. 3B simultaneously. In a step S30, when a plasma (not drawn) bombards the metal target material, a reactant gas (not drawn) is pumped into the reaction chamber (not drawn) to perform a chemical reaction with the metal target material, and to form a plurality of metal oxide conductor layers 140 on the array substrate 100a. At the moment, the metal oxide conductor layers 140 cover the protective layer 130, and each of the metal oxide conductor layers 140 is electrically connected to the drain 122b of each of the corresponding active devices 120 through each of the corresponding openings 132. Herein, the reactant gas is, for example, oxygen. Thus, the manufacture of the reflective active device array substrate 100 is completed.

For example, according to the manufacturing method, if molybdenum is selected as a metal target material, molybdenum oxide may be formed through bumping into oxygen when a plasma bombards the metal target material. Compared with general metal molybdenum, about 60% of incident light can be reflected, and the molybdenum oxide with the same thickness can reflect about 6% of incident light, which significantly reduces the light reflectivity.

In brief, in the manufacturing method of the reflective active device array substrate 100 of the present embodiment, the metal oxide conductor layers 140 replace the conductive electrode of the conventional metal material. Therefore, the reflective active device array substrate 100 has low light reflectivity in addition to conductivity and light shielding effect, and can reduce external light reflection.

Figure 4:
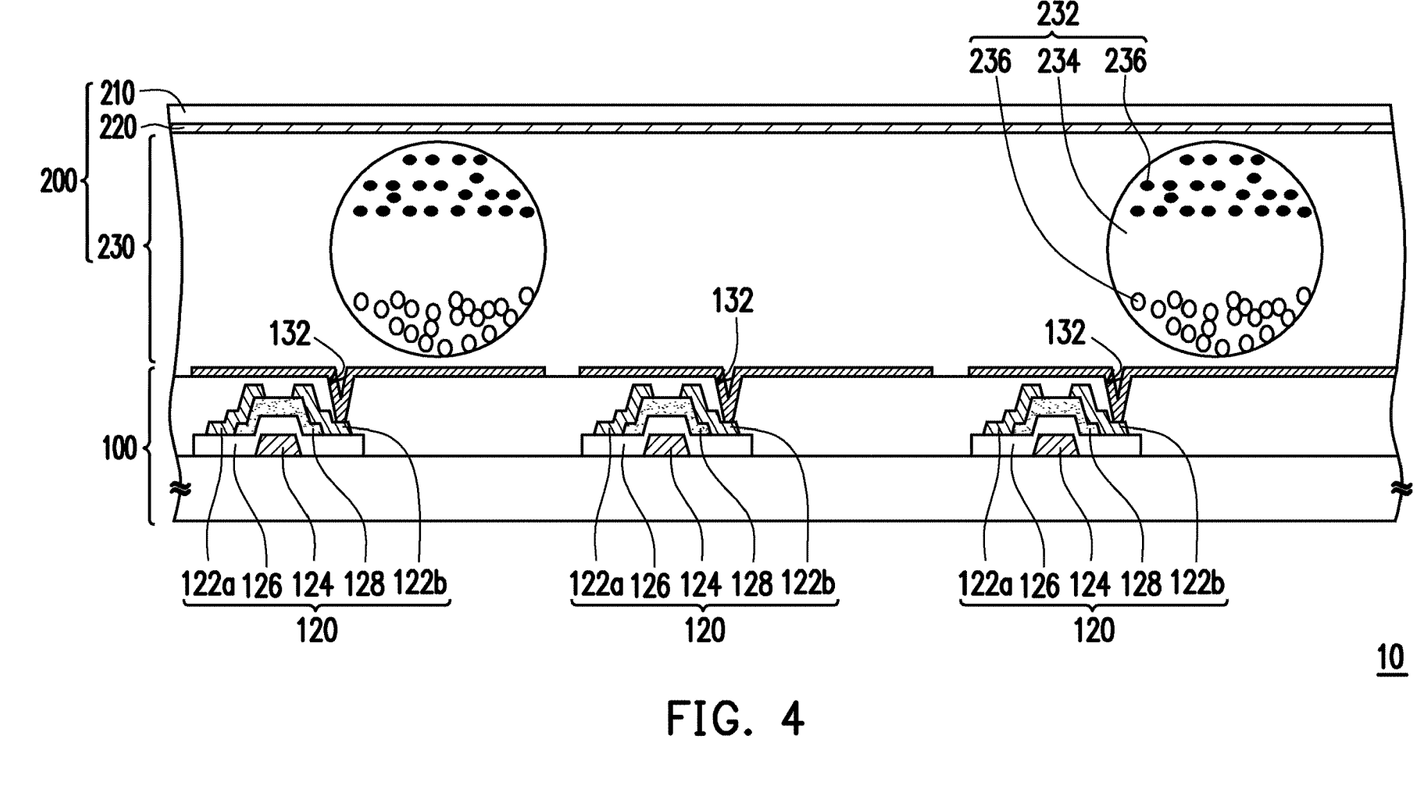
FIG. 4 is a cross-sectional schematic view of a reflective display apparatus of another embodiment of the disclosure.

FIG. 4 is a cross-sectional schematic view of a reflective display apparatus of another embodiment of the disclosure. Please refer to FIG. 4. A reflective display apparatus 10 of the present embodiment includes the above reflective active device array substrate 100, and an electrophoretic display film 200, wherein the electrophoretic display film 200 is disposed on the reflective active device array substrate 100. The electrophoretic display film 200 includes a flexible substrate 210, a transparent conductive layer 220 and a display medium layer 230. The transparent conductive layer 220 is disposed on the flexible substrate 210, and is located between the reflective active device array substrate 100 and the flexible substrate 210. Herein, a material of the flexible substrate 210 may be polyethylene terephthalate (PET) or polyethylene napthalate (PEN), but is not limited hereto. A material of the transparent conductive layer 220 may be indium tin oxide (ITO), but is not limited hereto. The display medium layer 230 is disposed on the flexible substrate 210, and is located between the reflective active device array substrate 100 and the transparent conductive layer 220. The display medium layer 230 includes a plurality of display mediums 232 (only two are drawn schematically in FIG. 3), each display medium 232 includes an electrophoretic liquid 234 and a plurality of charged particles 236 distributed in the electrophoretic liquid 234. Specifically, the charged particles 236 includes a plurality of white charged particles and a plurality of black charged particles, and a movement of the black charged particles and the white charged particles may be driven by a method of adding DC voltage or AC voltage, so as to display black, white or gray of different gradations. Surely, in other embodiments that are not drawn, each of the display mediums may also include the electrophoretic liquid and the plurality of white charged particles distributed in the electrophoretic liquid, wherein the electrophoretic liquid may be, for example, a black electrophoretic liquid; or, the electrophoretic liquid and the charged particles may have other colors and are not limited hereto.

In the manufacturing process of the reflective display apparatus 10, after the reflective active device array substrate 100 is formed through the method of FIG. 2 and FIG. 3A to FIG. 3B, the electrophoretic display film 200 is assembled on the reflective active device array substrate 100 as shown in FIG. 4. Herein, the manufacture of the reflective display apparatus 10 is completed.

In brief, the reflective display apparatus 10 of the present embodiment includes the above reflective active device array substrate 100, wherein the reflective active device array substrate 100 uses the metal oxide conductor layers 140 as the conductive electrode. Compared with the conventional use of the metal material as the conductive electrode, the metal oxide conductor layers 140 of the present embodiment may reduce the reflection of external light without generating bright spots when a broken hole occurs to the electrophoretic display film 200, so as to make the reflective display apparatus 10 have a better display quality.

Based on the above, in the structure of the reflective active device array substrate of the disclosure, the metal oxide conductor layers are used as the conductive electrode. Compared with the conventional use of the metal material as the conductive electrode, the metal oxide conductor layers of the disclosure has a lower light reflectivity, and may reduce external light reflection. Therefore, the reflective display apparatus adopting the reflective active device array substrate of the disclosure may make the reflective display apparatus have a better display quality since the metal oxide conductor layer may reduce the reflection of external light without generating bright spots when a broken hole occurs to the electrophoretic display film thereof.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A reflective active device array substrate comprising:
    a substrate;
    a plurality of active devices dispersedly disposed on the substrate;
    a protective layer disposed on the substrate and covering the plurality of active devices, wherein the protective layer has a plurality of openings, and each of the plurality of openings respectively exposes a source or a drain of each of the corresponding active devices; and
    a plurality of metal oxide conductor layers disposed on the substrate and covering the protective layer, wherein each of the plurality of metal oxide conductor layers is connected to the source or the drain of each of the corresponding active devices through each of the corresponding openings.

2. The reflective active device array substrate according to claim 1, wherein a material of each of the plurality of metal oxide conductor layers comprises molybdenum oxide, molybdenum-niobium oxide, tantalum oxide, or aluminum oxide.

3. The reflective active device array substrate according to claim 1, wherein each of the plurality of active devices comprises:
    a gate disposed on the substrate;
    a semiconductor channel layer;
    a gate insulating layer covering the gate, and located between the gate and the semiconductor channel layer; and
    the source and the drain disposed on a same side of the semiconductor channel layer, and exposing a portion of the semiconductor channel layer.

4. A reflective display apparatus comprising:
    a reflective active device array substrate comprising:
    a substrate;
    a plurality of active devices dispersedly disposed on the substrate;
    a protective layer disposed on the substrate and covering the plurality of active devices, wherein the protective layer has a plurality of openings, and each of the plurality of openings respectively exposes a source or a drain of each of the corresponding active devices; and
    a plurality of metal oxide conductor layers disposed on the substrate and covering the protective layer, wherein each of plurality of the metal oxide conductor layers is electrically connected to the source or the drain of each of the corresponding active devices through each of the corresponding openings; and
    an electrophoretic display film disposed on the reflective active device array substrate.

5. The reflective display apparatus according to claim 4, wherein a material of each of plurality of the metal oxide conductor layers comprises molybdenum oxide, molybdenum-niobium oxide, tantalum oxide, or aluminum oxide.

6. The reflective display apparatus according to claim 4, wherein each of the plurality of active devices comprises:
    a gate disposed on the substrate;
    a semiconductor channel layer;
    a gate insulating layer covering the gate and located between the gate and the semiconductor channel layer; and
    the source and the drain disposed on a same side of the semiconductor channel layer and exposing a portion of the semiconductor channel layer.

7. The reflective display apparatus according to claim 4, wherein the electrophoretic display film comprises:
    a flexible substrate;
    a transparent conductive layer disposed on the flexible substrate and located between the reflective active device array substrate and the flexible substrate; and
    a display medium layer disposed on the flexible substrate and located between the reflective active device array substrate and the transparent conductive layer, wherein the display medium layer comprises a plurality of display mediums and each of the plurality of display mediums comprises an electrophoretic liquid and a plurality of charged particles distributed in the electrophoretic liquid.

* * * * *